(12) United States Patent
Chenicheri Vadakkil (10) Patent No.: US 11,958,612 B2
(45) Date of Patent: Apr. 16, 2024

(54) METHOD AND ARRANGEMENT FOR PROGRAMMABLE PERIODIC INCREASE IN THE STANDARD LEGROOM PROVIDED IN AIRLINE PASSENGER SEATING FOR ADDITIONAL PASSENGER SAFETY AND COMFORT

(71) Applicant: Venugopalan Chenicheri Vadakkil, Bangalore (IN)

(72) Inventor: Venugopalan Chenicheri Vadakkil, Bangalore (IN)

( * ) Notice: Subject to any disclaimer, the term of this patent is extended or adjusted under 35 U.S.C. 154(b) by 403 days.

(21) Appl. No.: 17/436,596

(22) PCT Filed: Feb. 20, 2020

(86) PCT No.: PCT/IB2020/051424
§ 371 (c)(1),
(2) Date: Sep. 4, 2021

(87) PCT Pub. No.: WO2021/148846
PCT Pub. Date: Jul. 29, 2021

(65) Prior Publication Data
US 2022/0169391 A1    Jun. 2, 2022

(30) Foreign Application Priority Data

Jan. 23, 2020  (IN) .............................. 202041002987

(51) Int. Cl.
*B64D 11/06*          (2006.01)
(52) U.S. Cl.
CPC ................ *B64D 11/0639* (2014.12)
(58) Field of Classification Search
CPC .... B64D 11/0639; B64D 11/0696; B60N 2/01
See application file for complete search history.

(56) References Cited

U.S. PATENT DOCUMENTS

2009/0066121 A1   3/2009  Jacob
2011/0017869 A1   1/2011  Gonnsen et al.
(Continued)

FOREIGN PATENT DOCUMENTS

CN         112977833 A  *  6/2021
WO   WO-2019197280 A1  *  10/2019  ............. B64D 11/06

OTHER PUBLICATIONS

International Search Report dated Jul. 16, 2020.
Written Opinion of the International Searching Authority dated Jul. 16, 2020.

*Primary Examiner* — Mohammad Ali
*Assistant Examiner* — Dhruvkumar Patel
(74) *Attorney, Agent, or Firm* — Preston Smirman; SMIRMAN IP LAW, PLLC (57) ABSTRACT

The present invention describes an arrangement and method for Programmable, Periodic, Substantial increase in the standard leg room provided in Airline seating for a planned limited duration, this is achieved by having the standard airline chair rows being mounted on specially designed sliding base assembly fixed on to the aircraft cabin floor, which allows the seat rows to be moved in a fore and aft directions in relation to each other in a programmable periodic manner by Hydraulic means and in a sequential manner covering all seat rows with the condition that at all times and under no circumstances the standard leg room already provided is reduced or compromised for any of the seats, thereby serving the express purpose of giving periodic relief from discomfort, mental and physical stress to airline passengers on long duration flights now being seated in compact rows with absolute minimum leg room.

6 Claims, 11 Drawing Sheets

(56) References Cited

U.S. PATENT DOCUMENTS

| | | | |
|---|---|---|---|
| 2011/0042514 A1 | 2/2011 | Ehlers et al. | |
| 2011/0062285 A1* | 3/2011 | Herzog | B64D 11/0601 244/118.6 |
| 2012/0072079 A1* | 3/2012 | Schliwa | B64D 11/0601 701/49 |
| 2015/0145300 A1* | 5/2015 | Finlay | B64D 11/0696 297/257 |

* cited by examiner

METHOD AND ARRANGEMENT FOR PROGRAMMABLE PERIODIC INCREASE IN THE STANDARD LEGROOM PROVIDED IN AIRLINE PASSENGER SEATING FOR ADDITIONAL PASSENGER SAFETY AND COMFORT

CROSS-REFERENCE TO RELATED APPLICATION

The instant application is a national phase of PCT International Patent Application Serial No. PCT/IB2020/051424 filed Feb. 20, 2020, and claims priority to Indian Patent Application Serial No. 202041002987 filed Jan. 23, 2020, the entire specifications of both of which are expressly incorporated herein by reference.

BRIEF DESCRIPTION AND BACKGROUND

This Invention relates to an airline passenger seat arrangement wherein a provision is made for a mounting base with built in facility to move the mounted seat/seats to and fro in the longitudinal direction of the passenger cabin by hydraulic means and the said arrangement providing for a substantial increase in the STANDARD legroom provided and this happening in a programmable periodic duration in a sequential manner for each row of seating, covering all seats/seat rows without reducing or compromising the standard leg room already provided for any of the existing seats. This invention when incorporated in a passenger aircraft will provide every passenger during a long flight periodic relief in discomfort, mental and physical stress faced by all the passengers normally seated during the entire duration of the flight in compact rows of seating with only absolute minimum legroom provided in the present modern aircraft cabin due to various reasons. Studies have proven that compact flight seating with minimum legroom can lead to stiff and sore joints, as well as the risk of life-threatening blood clots from lack of movement.

for example, Most of the Airlines in their economy class seating have a seat pitch of 30 inches and the actual seating portion of the seat measures from the rear end to the front end 22 inches, Thus leaving only 8 inches as the standard legroom, which is highly inconvenient and stressful during long duration flights the present invention when incorporated will allow the legroom in the above case to be increased from 8 inches to 20 inches for a certain duration periodically as per predefined program which may be 10 minutes every 2 hrs or 15 minutes every 3 hours etc., Different predefined program will be suitably configured and available to be selected according to the duration of flight, time of the day or night the actual flight is taking place, and also according passenger preferences and requirements studied over a period taken into consideration.

Therefore the said Invention having a seating arrangement and a method which will provide an airline passenger with the relief of substantially increased "legroom" for a certain Programmable duration periodically during a long flight will allow for free movement and relaxation during such periods, The said periods will occur several times during a long flight sequentially covering all the passengers on the flight. The actual functioning of this invention when incorporated in a passenger aircraft will happen only during level flying airborne situation and will be under the master control of the pilot flying the aircraft.

The built in hydraulic arrangement in the seat mounting base for moving the seat/row of seats, in a Longitudinal to and fro movement in a Passenger Aircraft cabin consists of a rigid sliding structure connected with hydraulic piston.

The hydraulic piston is electronically operated by hydraulic valves and pipelines connected to centrally located hydraulic unit with facility for electronically programming the functioning as required.

For example the programming can achieve when required individual longitudinal to and fro movement of seat/row of seats and also achieve when required, coordinated very slow and simultaneous longitudinal to and fro movement of a number of seat rows in a batch of seat rows, in an a normal passenger aircraft cabin without causing any relative movement between seat rows ensuring that the "standard minimum leg-room provided in passenger seating is never compromised", All the above to be achieved "without sacrificing the number of seats possible to be provided in a present existing configuration and set-up of a passenger aircraft cabin".

This to be achieved by using some portion of the available unused spaces inside the passenger aircraft cabin when the aircraft is specially in a airborne level flying situation.

The sufficient extra reserved space now being provided in the front row of a batch of seats for entry/exit/emergency exit of passengers will have not much use and serve no great purpose when the aircraft is an airborne and level flying situation.

The programming can ensure that at all times and under all circumstances "The safety spaces requirement will never be compromised", as the movement of seats will happen only when the aircraft is in level flying normal airborne situation and revert back to the original standard set-up at all other times.

It is well known to every-one that all over the world airline seats sizes and the distance between the seats have been shrinking, specially the economy seats which form 90% of the seats of a passenger aircraft, The main reason for this is all airlines are trying their best to Pack as many passengers as possible in the economy section of a passenger aircraft cabin by adding more seat rows as well as adding more seats in each row, even as the cabin size remains constant, they are justifying the same saying the passengers are demanding competitive low pricing for the tickets and there is no other way to achieve this except by designing seats with absolute minimum legroom for each passenger.

The situation has become very acute and the passengers are now literally forced to undergo a lot of physical and mental stress threatening their very health and well being by being forced to be confined in a restricted space with minimum legroom for long duration of more than 8/16 hours in inter-national and inter-continental flights.

The said invention addresses the above concerns by providing the above mentioned passengers with periodic relief, (For example every 2 hours) in the form of substantial increase in the legroom for a limited duration, (For example 10 minutes) and sequentially applicable to all the passengers, thereby allowing them during such above mentioned duration to stretch their legs/stand comfortably/Possibly exchange seats to share the comfort/discomfort mutually during the long duration flight depending on their seat being a window seat/middle seat/aisle seat etc.

The passengers can also move freely to access the aisle to go to the restrooms which are likely to be much less crowded as the mentioned arrangement will evenly distribute the usage, Apart from these benefits in future it may be possible for passengers to sequentially access the possibly distributed cafeteria sections situated along the aircraft cabin where the passenger can have better choice of food and eat in a more comfortable position, eliminating a lot of cost/effort/wastage and complaints related to one size fits all, limited fixed menu now being served at their seat locations. It may also be possible in future to eliminate the folding table provided at seat locations, thus reducing weight and costs etc., Also it may be possible to explore using the Hydraulic facilities already available and existing in all Aircraft for operating the landing gear and other requirements etc, which are not in use when the aircraft is in level flying airborne situation, and thus can be used for the hydraulic means required for operating the above mentioned invention without incurring additional costs etc., keeping in mind that the actual operation and functioning of the said invention when incorporated in a passenger airline takes place only when the aircraft is in level flying airborne situation, constituting almost 90% of the time of a long duration flight.

PRIOR ART

Airplane seats are now available called "flexi seats" Where a row of seats can be unlocked manually from its original position and manually moved on a rail provided and locked in different position. when a row is confirmed as not occupied as per the booking data, before the passengers arrive to take their seat location, The air line crew can fold the seats of the unoccupied row in a such way to take up much less space, thereby the row of seats in front of the unoccupied seat row can be manually unlocked from its original position on the rail and moved back and locked in new position on the rail resulting in more legroom for that row of seats.

Another airplane seat arrangement with movable seat rows is described in US patent No. 2015/0145300 A1 dated May 28, 2015. The above mentioned Patent describes a "Method and arrangement for adjusting the spacing of Vehicle seats Based on the Size of the seat occupant" Since a long time most Cars have seats provided with mechanisms operated manually or by electrical means to move the seats back and forth to accommodate different sized passengers comfortably.

SUMMARY

The present invention describes a hitherto unknown arrangement and method for Programmable, Periodic, Substantial increase in the standard leg room provided in Airline seating for a planned limited duration, this is achieved by having the standard airline chair rows being mounted on specially designed sliding base assembly fixed on to the aircraft cabin floor, which allows the seat rows to be moved to and fro by a fixed distance in the longitudinal direction relative to the aircraft cabin in a programmable periodic manner by Hydraulic means and in a sequential manner covering all seats/seat rows with the condition that at no time and under no circumstances the standard leg room already provided is reduced or compromised for any of the seats.

The present invention thereby serves the express purpose of giving periodic relief to the seated airline passengers on long duration flights in the form of substantially increased leg room, allowing them all sorts of relief from the discomfort, mental and physical stress associated with being seated in compact rows of seating with absolute minimum leg room provided in the present modern aircraft cabin due to various reasons.

The present invention unlike the earlier mentioned US patent No. 2015/0145300 A1 dated May 28, 2015. does not involve any reducing of standard provided legroom of one row of seated passengers to increase the legroom for adjacent row of seated passengers. As per the present invention at no time there will be any reduction in the standard leg room provided for a passenger.

OBJECTS OF THE PRESENT INVENTION

The principle object of the present Invention is to provide an airline passengers who are now literally being forced to undergo a lot of physical and mental stress threatening their very health and well being by being forced to be confined in a restricted space with minimum legroom for long duration of more than 8/16 hours in inter-national and inter-continental flights, with periodic relief from the discomfort, mental and physical stress associated with being seated in compact rows of seating with absolute minimum leg room provided in the present modern aircraft cabin due to various reasons, This being achieved by providing the said airline passengers with a substantially increased "legroom" for a certain programmable duration in the course of a long duration flight allowing him/her to have free movement and relaxation during such periods.

Another object of this Invention is to provide the airline passengers periodically easy and free access the aisle to go to the restrooms which are likely to be much less crowded as the mentioned arrangement will evenly distribute the usage,

DETAILED DESCRIPTION WITH REFERENCE TO THE ACCOMPANYING DRAWINGS

Figure 1:
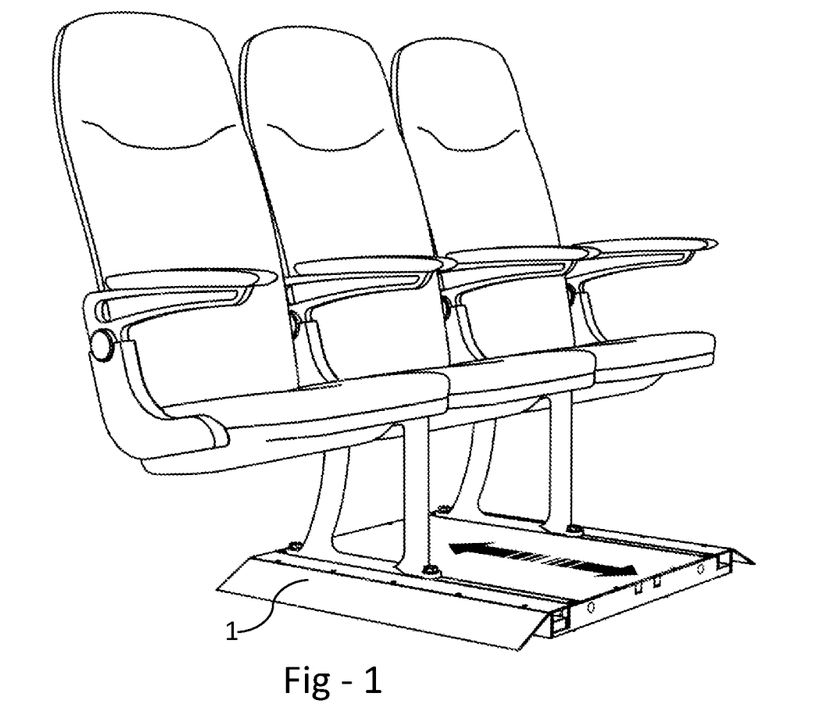
FIG. 1 represents a perspective view of the complete sliding base assembly with a row of airline chairs shown mounted on it.

A preferred embodiment of the present invention without in anyway limiting the scope of the present invention is given below and it is best understood when the following description of the invention is read with reference to the accompanying drawings in which;

FIG. 1 represents a perspective view of the complete sliding base assembly no. 1 with a row of airline chairs No. 2 shown mounted on it.

Figure 2:
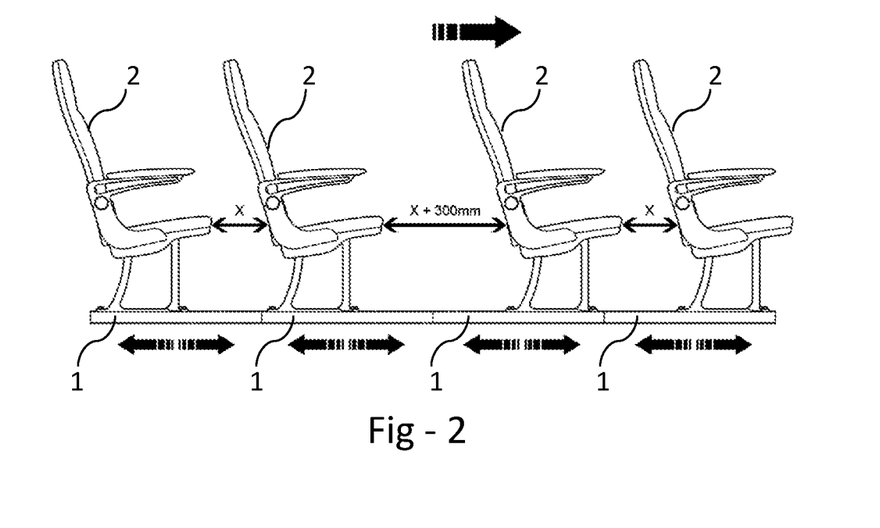
FIG. 2 represents an orthographic view showing a batch of four sliding base assemblies with each of the mentioned assembly mounted with Row of airline seats.

FIG. 2 represents an orthographic view showing a batch of four sliding base assemblies indicated by No. 1 with each of the mentioned assembly mounted with Row of airline seats No. 2, This figure also shows a particular situation when the 2 Airline chair rows on the right of the drawing are situated in the forward end of the sliding position of the mentioned sliding base assembly and the 2 Airline chair rows on the left of the drawing are in the backward end of the sliding position of the mentioned sliding base assembly.

In the said particular situation shown in the drawing results in the extra legroom X+300 mm shown in the drawing for one row of chairs while maintaining the standard leg room X shown between the other 2 rows of chairs.

Figure 3:
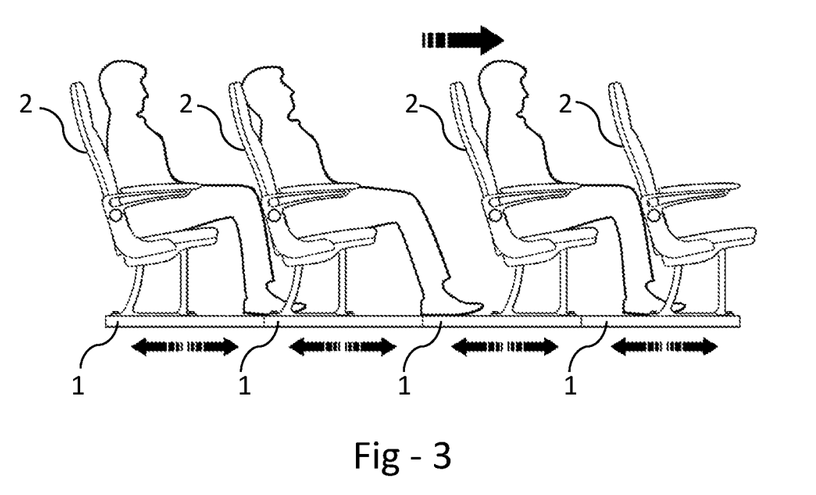
FIG. 3 represents an orthographic view of seat rows with line drawing of seated passengers with normal standard leg room as well as increased legroom.

FIG. 3 represents an orthographic view similar to the view shown in FIG. 2, this figure also shows the seat rows with line drawing of seated passengers with normal standard leg room as well as increased legroom periodically provided for each seat row in a sequential manner by incorporating the present invention for seating of airline passengers in a passenger aircraft.

Figure 4:
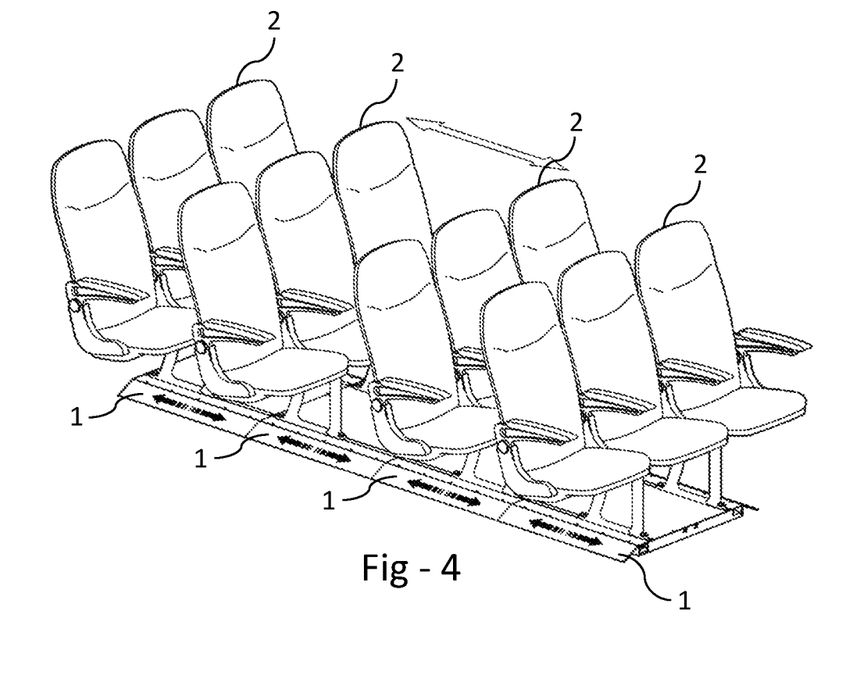
FIG. 4 represents an Isometric view of a batch of 4 sliding base assemblies, with each mounted with a row of Airline chairs.

FIG. 4 represents an Isometric view of a batch of 4 sliding base assemblies No. 1, with each mounted with a row of Airline chairs No. 2, in the similar situation mentioned in the description for FIG. 2.

Figure 5:
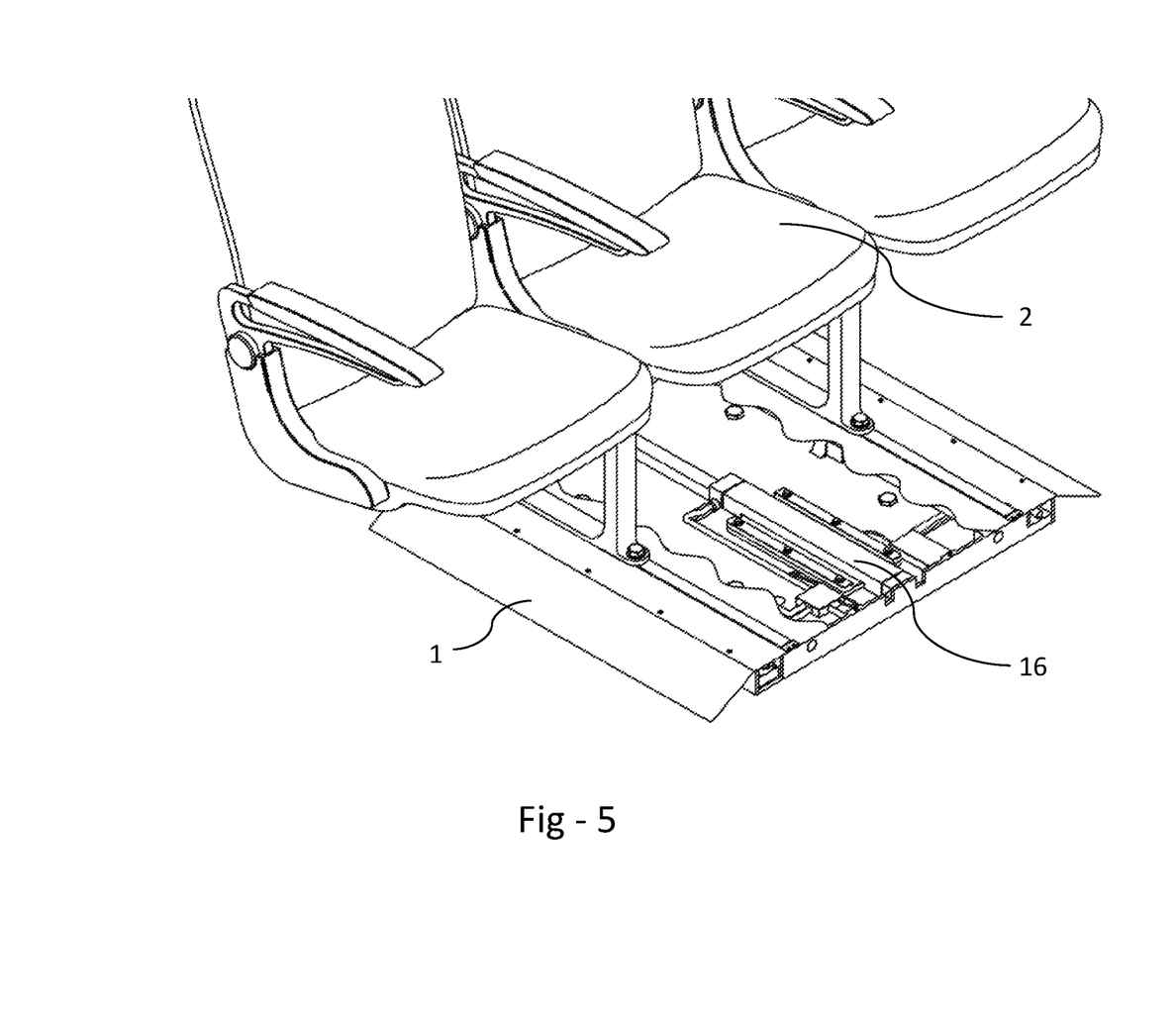
FIG. 5 represents an isometric view of a single sliding base assembly with a row of chairs No. 2 mounted on it partly shown.
Figure 6:
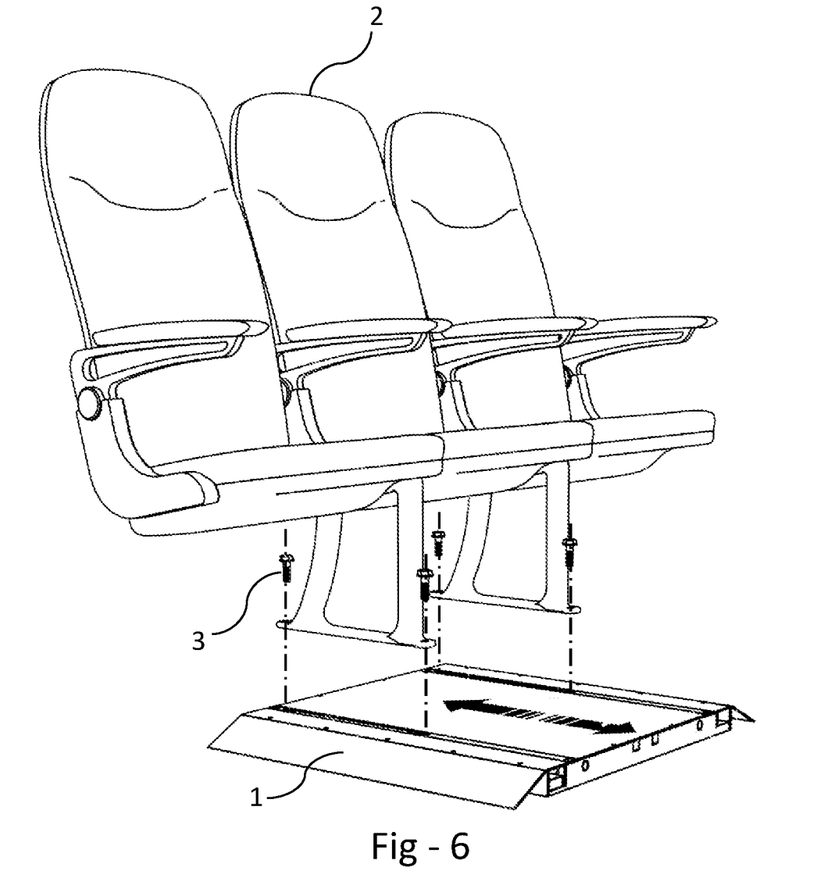
FIG. 6 represents an perspective exploded view showing the arrangement of mounting a row of airline chairs.

FIG. 5 represents an isometric view of a single sliding base assembly No. 1 with a row of chairs No. 2 mounted on it partly shown, The sliding base assembly is shown with the middle portion of its top cover plate No. 4 cut out to show partly some of its internal working features like the hydraulic cylinder with pipelines etc., FIG. 6 represents an perspective exploded view showing the arrangement of mounting a row of airline chairs No. 2 on hydraulic sliding base No. 1 using four numbers of chair row mounting bolts No. 3.

Figure 7:
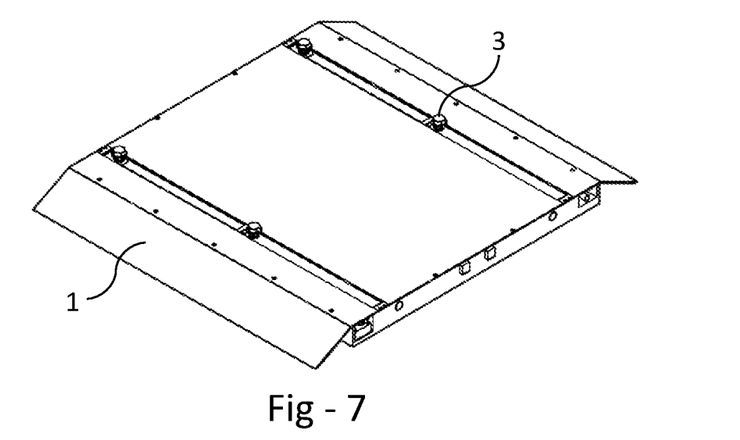
FIG. 7 represents an isometric view of a single sliding base assembly

FIG. 7 represents an isometric view of a single sliding base assembly No. 1, also showing the airline chair row mounting bolts No. 3, four numbers in their applicable location.

Figure 8:
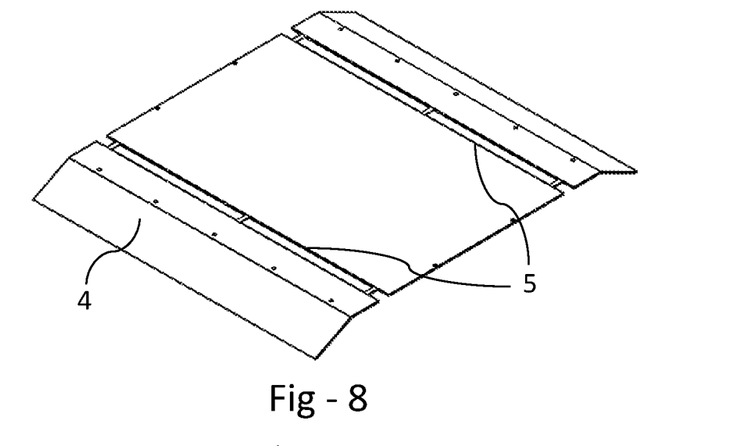
FIG. 8 represents an isometric view of the removed top cover

FIG. 8 represents an isometric view of the removed top cover No. 4 of the Hydraulic sliding base assembly No. 1 also showing the two slots No. 5 provided on the said top cover No. 4 for the purpose of allowing sliding movement of the chair row. No. 2.

Figure 9:
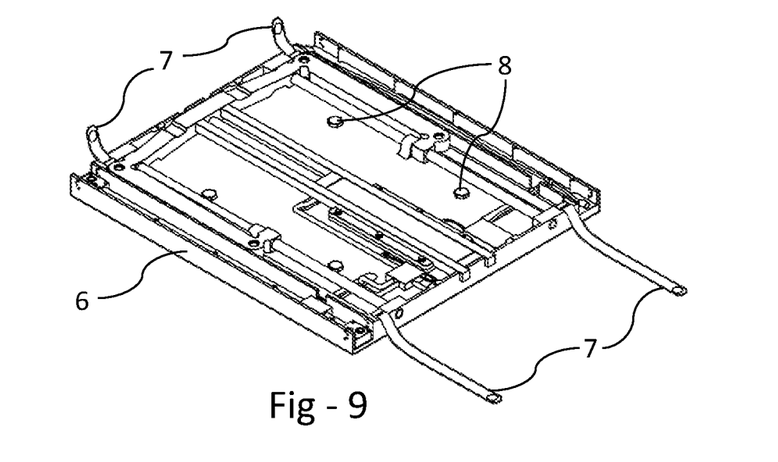
FIG. 9 represents an isometric view of the Sliding base assembly with the top cover removed.

FIG. 9 represents an isometric view of the Sliding base assembly No. 1 with the top cover No. 4 removed, thus showing the internal parts situated in the sliding base assembly housing body No. 6, including the partly disassembled sliding steel belts No. 7, two numbers meant for covering the two slots No. 5 shown in FIG. 8, when the top cover No. 4 is located in position on top of the sliding base assembly housing No. 6.

Bolts No. 8, four numbers shown is meant for fixing the sliding base assembly No. 1 to the floor of the Aircraft passenger cabin.

Figure 10:
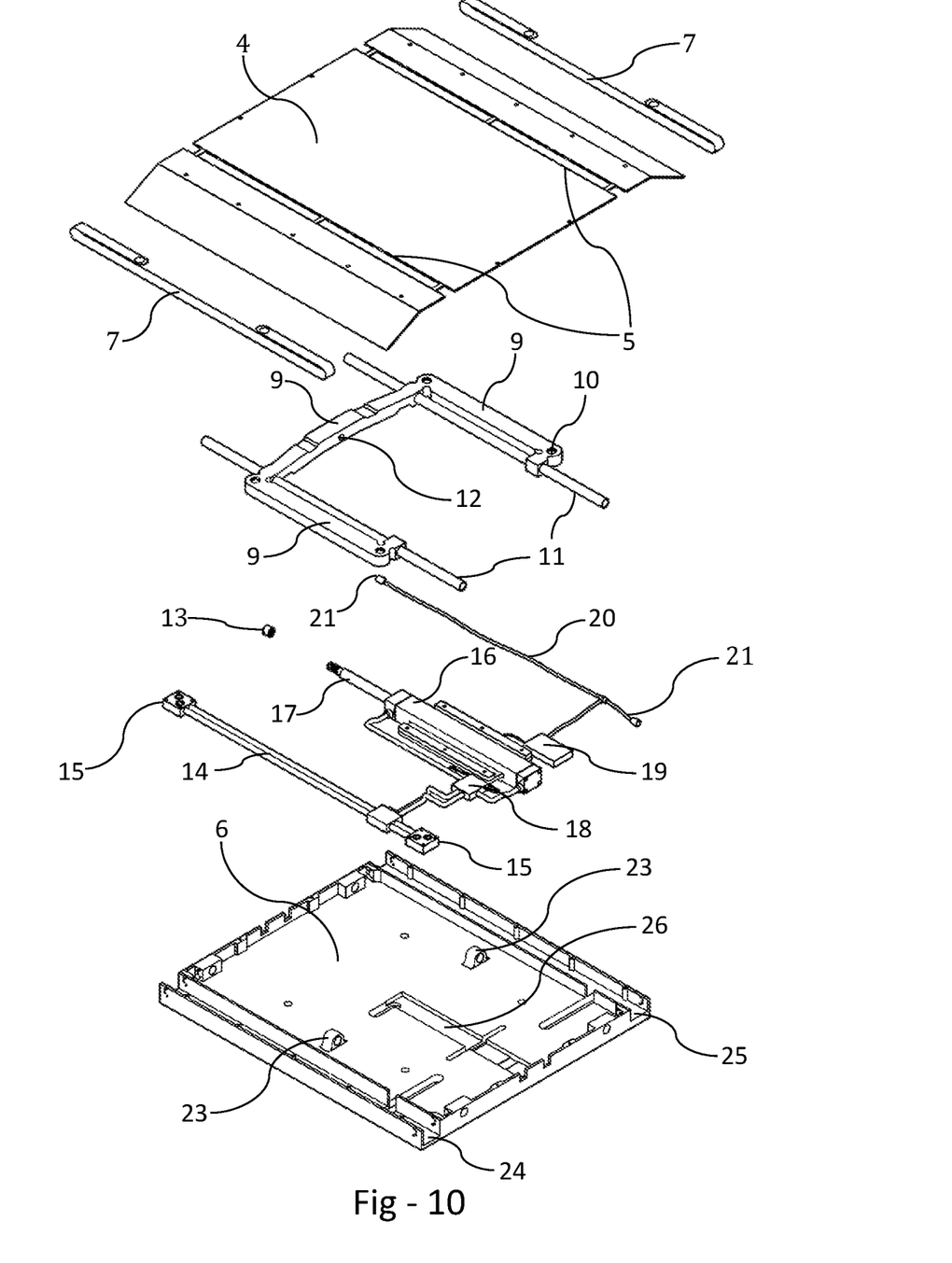
FIG. 10 represents an exploded isometric view of the sliding base assembly showing the various assemblies and parts thereof.

FIG. 10 represents an exploded isometric view of the sliding base assembly No. 1, At the top of the drawing is shown the top cover No. 4, having adjacent on the sides of No. 4 is shown the 2 sliding steel belts No. 7, in a displaced position.

Below the top cover No. 4 is shown sliding U-bracket No. 9, with threaded holes No. 10 four numbers, on it meant for mounting of Airline chair row No. 2 mentioned in FIG. 1.

The U-bracket is provided with four guide bushings at appropriate places by which it accommodates and slides over the Guide bars No. 11 two numbers, which will be rigidly mounted at two fixed locations inside sliding base assembly housing No. 6.

The above mentioned U-bracket No. 9 also shows on it a mounting hole No. 12, meant for connecting it to the Hydraulic piston No. 17 using nut No. 13.

Further below the above explained portion is shown the assembly of the Hydraulic segment consisting of pipelines, fittings and other parts connected with this segment which will be situated inside the sliding base assembly housing No. 6, The hydraulic circuit shown consists of two hydraulic pipelines No. 14, having hydraulic connecting blocks No. 15 at its two ends.

Double acting Hydraulic cylinder No. 16 is shown with its piston No. 17 in the forward working position. The hydraulic control valve unit No. 18 is shown on one side and the electronic control unit No. 19 is shown on the other side of the hydraulic cylinder No. 16, Also shown is the appropriate electric conduit No. 20 with suitable Multi-pin connectors No. 21 at its ends.

Further below the above mentioned portion is shown sliding base assembly housing No. 6, only the bare housing is shown without any of the parts which are meant to be incorporated in it.

The bare housing No. 6 shows two rectangular chambers No. 24 & 25 situated longitudinally at the two ends of the housing, Also shown is the central support bushing No. 23, two numbers built into the base housing for central support of guide bars No. 11, two numbers mentioned in FIG. 8 above.

Also shown is a large slot No. 26 in the lower middle portion of the base housing No. 6 is for accommodating the double acting hydraulic cylinder No. 16, mentioned earlier.

Chamber No. 24 is for locating the Hydraulic pipelines No. 14 mentioned in the above paragraph and chamber 25 is meant for locating the electric conduits No. 20 mentioned earlier.

Also shown inside the housing No. 6 is two integral projected portions No. 23 of the said housing meant to form central support for the two guide bars No. 11 mentioned above earlier.

Figure 11:
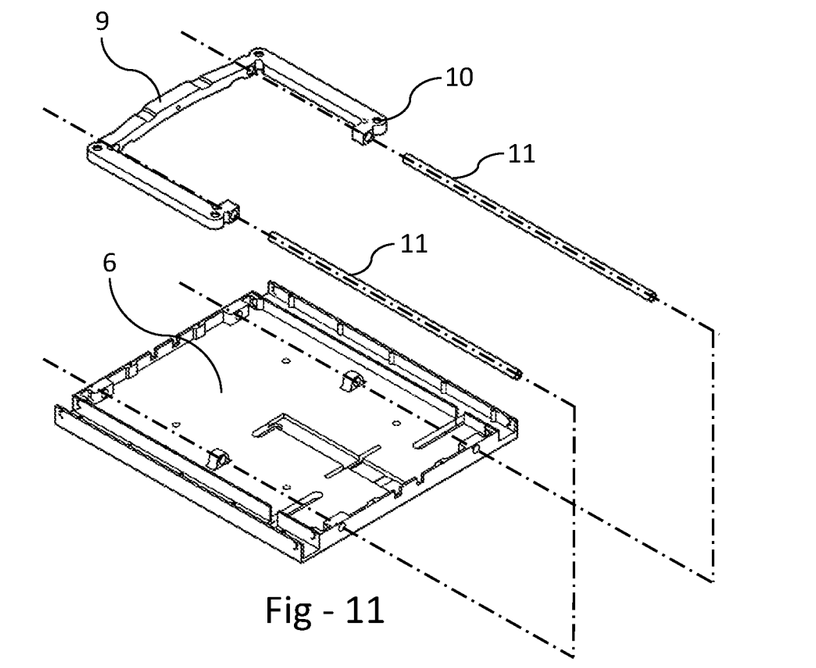
FIG. 11 represents an isometric exploded view showing the arrangement of the positioning of U-bracket with guide bars two numbers and their mounting positions in base body.

FIG. 11 represents an isometric exploded view showing the arrangement of the positioning of U-bracket No. 9, with guide bars two numbers No. 11, and their positioning inside the sliding base housing body No. 6. Chair mounting hole No. 10 is also shown.

Figure 12:
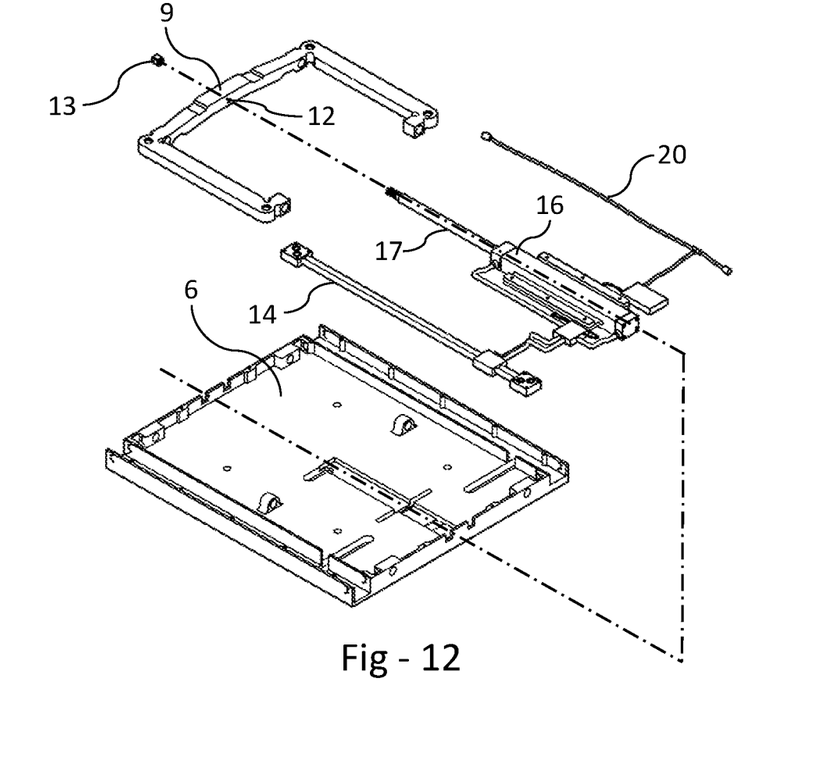
FIG. 12 represents an isometric exploded view showing the positioning of U-bracket within the complete hydraulic assembly consisting of several parts.

FIG. 12 represents an isometric exploded view showing the positioning of U-bracket No. 9, with complete hydraulic assembly consisting of several parts.

Only some parts such as hydraulic pipeline No. 14, cylinder No. 16, piston No. 17, electric conduit No. 20 are labeled. The positioning of complete hydraulic assembly inside the sliding base housing body No. 6, is also shown. Also the said figure shows Piston to U-bracket mounting hole No. 12 and mounting nut No. 13.

Figure 13:
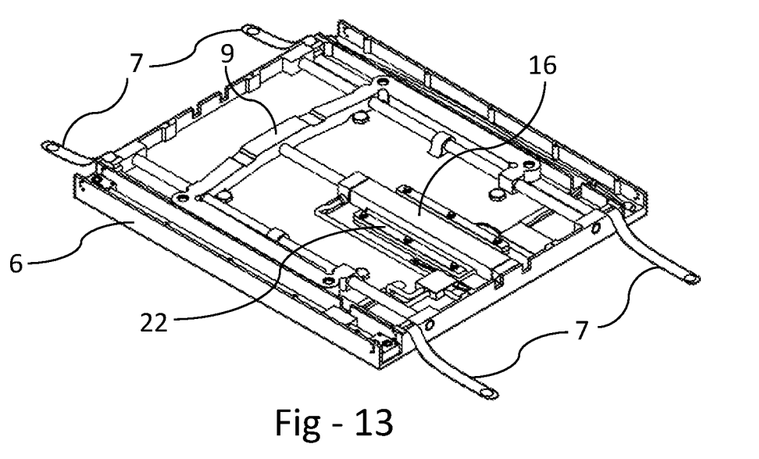
FIG. 13 represents an isometric view of the complete sliding base assembly No. 1, with its top cover No. 4 removed.

FIG. 13 represents an isometric view of the complete sliding base assembly No. 1, with its top cover No. 4 removed to show all other internal parts in actual assembled condition, The two sliding steel belts No. 7 is shown in partly disassembled condition at either ends.

This is to indicate that they have to be partly removed for facilitating the removal of the top cover No. 4 as those portions of the sliding steel belt No. 7 is meant to be above and sliding to cover the slots No. 5 provided on the top cover No. 4 mentioned earlier. No. 22 is the wing type portion on either side of hydraulic cylinder body to mount it on the base of housing No. 6.

Figure 14:
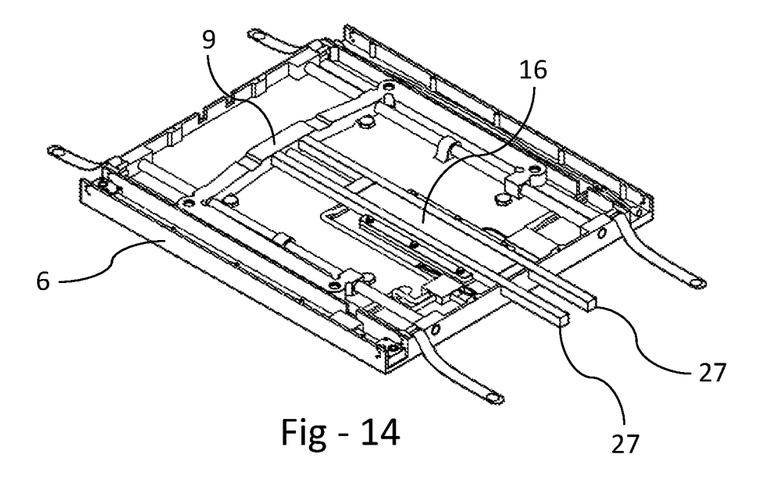
FIG. 14 represents an isometric view identical to that of FIG. 13 with the exception it also shows two safety guide bars No. 27 situated on either sides of the Hydraulic cylinder No. 16

FIG. 14 represents an isometric view identical to that of FIG. 13 with the exception it also shows two safety guide bars No. 27 situated on either sides of the Hydraulic cylinder No. 16 meant to serve the purpose of acting as mechanical interlocking safety bars acting between adjacently assembled sliding base assembly units, thereby ensuring at all times and under all circumstances the standard leg room provided is never reduced and compromised.

Figure 15:
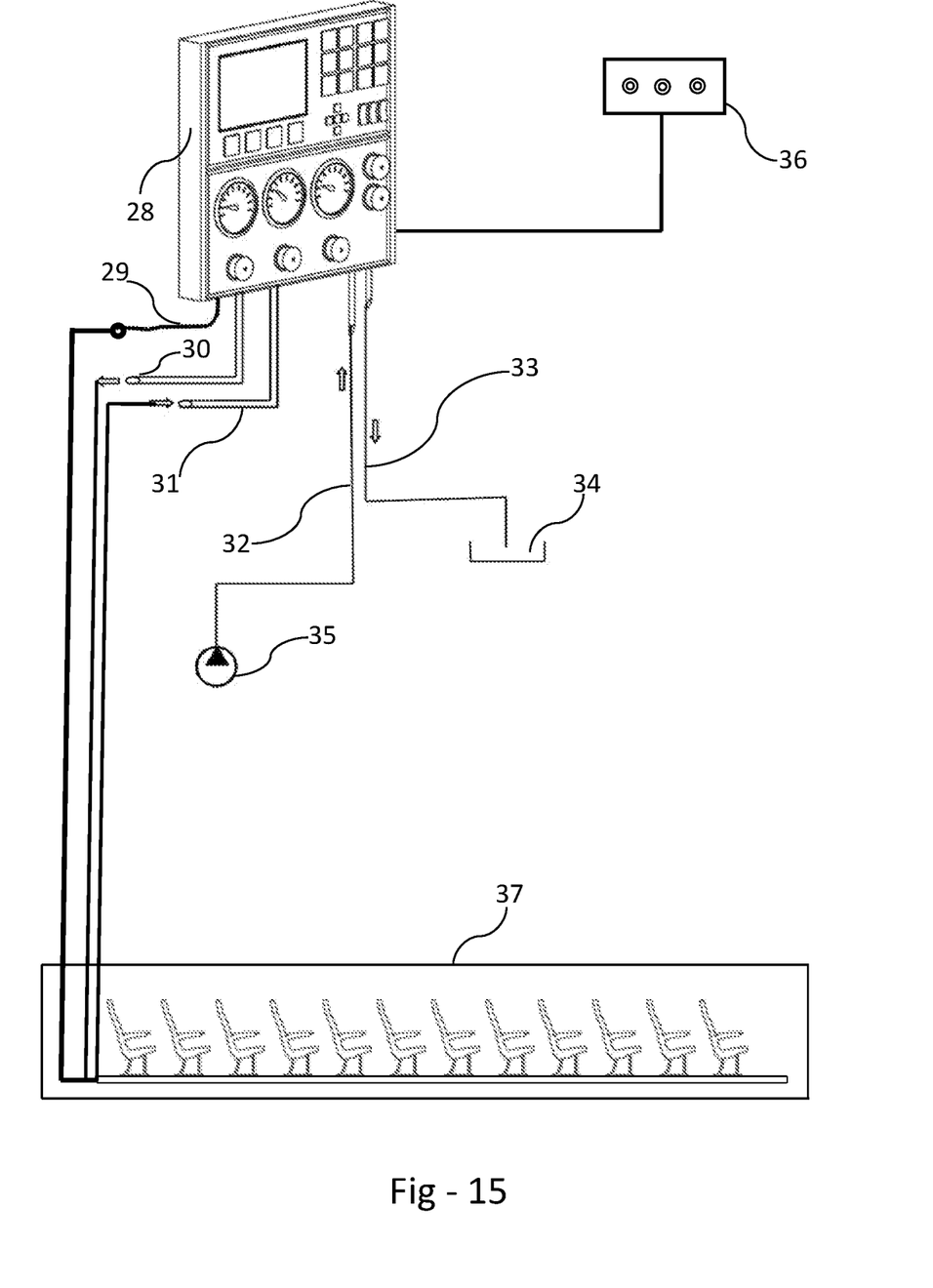
FIG. 15 represents an isometric view of the centrally situated combined panel No. 28 along with schematic diagram of other connected equipments.

FIG. 15 represents an isometric view of the centrally situated combined panel No. 28, having the electronic programming & display unit at the top portion and the main hydraulic control & monitoring unit at the bottom portion. No. 36 is the Master control unit in pilot cabin, so that the final authority for control and operating of the equipment mentioned in the invention will rest with the pilot operating the Passenger aircraft.

No. 29 is the control electronic wiring originating in the above mentioned combined control panel No. 28 leading to various mini control electronic unit No. 19 situated inside each of the sliding base assembly No. 1, for controlled programmable operation of the double acting hydraulic cylinder No. 16 by means of solenoid valves situated in the hydraulic control valve unit No. 18, situated in each sliding base assembly No. 1.

No. 30 & No. 31 represents the hydraulic oil supply line and return line leading to several sliding base assembly No. 1, situated in each block of passenger seats No. 37, and such block of seats situated at various systematically distributed locations in the passenger seating area of a passenger aircraft cabin. No. 32 is shown as hydraulic pressure line from hydraulic pump No. 35, leading to the combined control panel No. 28 mentioned above. No. 33 is shown as the hydraulic return pipe line from No. 28 to Fluid reservoir No. 34.

Figure 16:
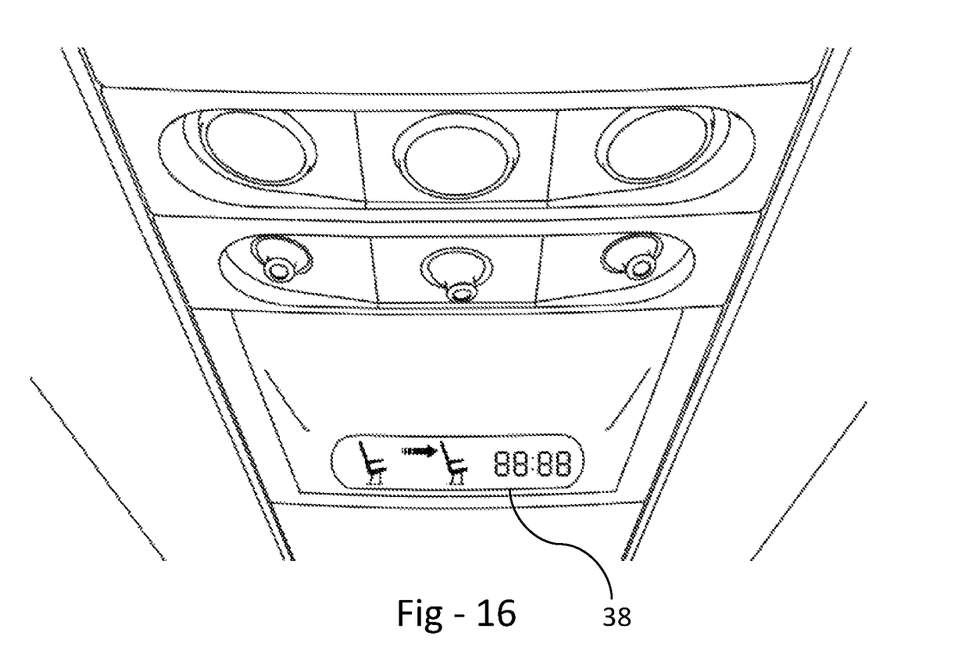
FIG. 16 shows a perspective view of the top portion of an aircraft cabin just above the seats where normally there is visual static display has been replaced with digital display.

FIG. 16 shows a perspective view of the top portion of an aircraft cabin just above the seats where normally there is visual static display No. 38, to indicate/instruct/inform the passengers seated in the chairs below and facing the mentioned display about safety requirements to be followed by them at any given time.

It is foreseen in the Embodiment of the said invention the above mentioned static visual display No. 38 will be changed to a digital visual display allowing for incorporating many more visual information and instructions as per various situations as necessary for the convenience and information of the seated passengers.

It also shows the overhead and in front of the seats display portion shows the digital visual display No. 38, indicating the increase in legroom will happen after how much time has to elapse according to the countdown clock display shown therein.

Figure 17:
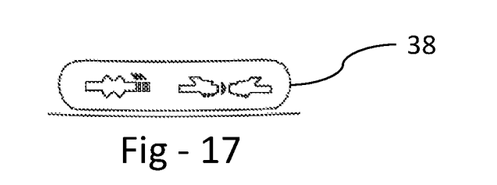
FIG. 17 Shows only the digital display portion indicating the standard display of no smoking and seat belt.

FIG. 17 Shows only the digital display portion No. 38 indicating the standard display of no smoking and seat belt existing in present static display available in all passenger aircraft which is appropriate except when the aircraft is in steady level flying condition which represents 90% of the long flight duration, when the proposed above mentioned invention comes into operation.

Figure 18:
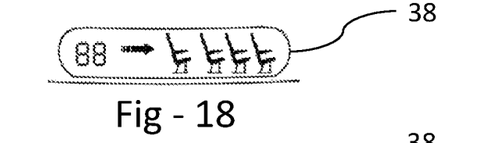
FIG. 18 shows only the digital display indicating visually and by the countdown clock showing the duration of the increased legroom available to that particular row of seats.

FIG. 18 shows only the digital display No. 38, indicating visually and by the countdown clock showing the duration of the increased legroom available to that particular row of seats.

Figure 19:
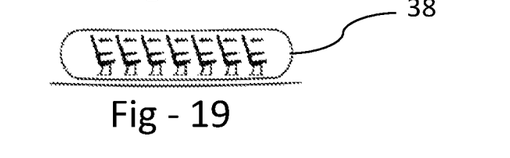
FIG. 19 shows only the digital display indicating by a flashing image of several row of chairs, that all rows in the said batch are moving very slowly in a synchronized manner back to the original position.

FIG. 19 shows only the digital display No. 38, indicating by a flashing image of several row of chairs, for may be 60 seconds indicating that all rows are moving very slowly in a synchronized manner back to the original position.

Figure 20:
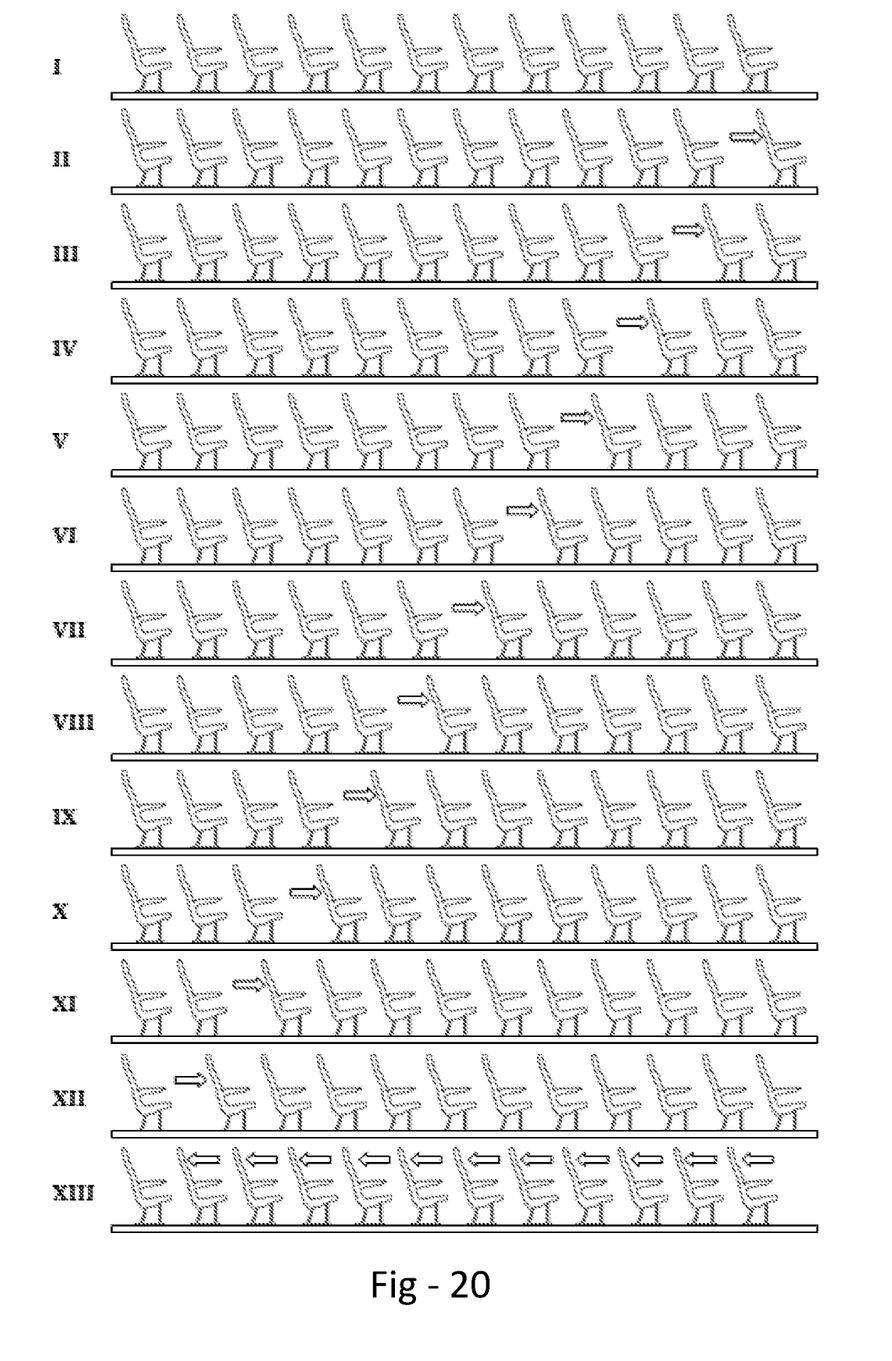
FIG. 20 shows a representative diagram showing different stages in the positioning of the chair rows during the working of the present invention in a programmable periodic manner as pre-decided.

Again it is explained here that the standard leg room provided will at all times remain constant even while all the chair rows in a block of chair rows are moving back FIG. 20 shows a block of 12 airline chair rows, represented by Greek numerals I to XIII indicating the various positions of the chair rows as per explanations given below:

I—All 12 seat Rows in NORMAL position with Standard Legroom with given invention utilizing some portion of available extra space provided in Front of the First row due to various reasons.

II—The First seat row moves forward in a controlled very slow speed using the hydraulic means provided in the Base, resulting in the prefixed substantial increase in legroom for passengers seated in the Second row of seats for a pre-planned programmable duration which repeats itself in a programmed periodic cyclical manner.

III—The 2nd Seat row moves forward as explained in II—above.

IV—The 3rd Seat row moves forward as explained in II—above.

V—The 4th Seat row moves forward as explained in II—above.

VI—The 5th Seat row moves forward as explained in II—above.

VII—The 6th Seat row moves forward as explained in II—above.

VIII—The 7th Seat row moves forward as explained in II—above.

IX—The 8th Seat row moves forward as explained in II—above.

X—The 9th Seat row moves forward as explained in II—above.

XI—The 10th Seat row moves forward as explained in II—above.

XII—The 11th Seat row moves forward as explained in II—above.

XIII—ALL seat rows from Eleventh Seat row to First Seat row move back very slowly & Simultaneously and at all times maintaining 100% the Standard Legroom, This being ensured by the Mechanical Interlock Mechanism provided in the Base Assembly. Now the ALL Seat rows will be back in their NORMAL position. This is the Position retained in all situations including Boarding, Taxing, Take-off, Climbing, Descending, and landing situation of a passenger aircraft. Once again it is clarified here that the proposed use of the present invention to move the seat rows will happen ONLY when the aircraft is in level flying air born situation which forms 90% of the duration of a long duration flight, so no safety requirement existing will be compromised.

LIST OF NAMES AS PER NUMBERS MENTIONED IN DRAWINGS

No. 1—Hydraulic Sliding Base Assembly.
No. 2—Row of airline chairs.
No. 3—Chair Row Mounting Bolts.
No. 4—Top cover plate of Hydraulic sliding base assembly No. 1.
No. 5—Two slots provided on top cover plate No. 4.
No. 6—Housing body of the hydraulic sliding base assembly.
No. 7—Sliding steel belts meant for covering two slots No. 5.
No. 8—Bolts for mounting No. 1, to the floor of an aircraft cabin.
No. 9—Sliding U-Bracket on which No. 2 is mounted using No. 3.
No. 10—Threaded holes Four numbers on No. 9 for mounting No. 2.
No. 11—Guide bars 2 numbers on which No. 9 slides inside No. 6.
No. 12—Mounting hole connecting Piston No. 17 to U-bracket No. 9.
No. 13—Nut for Mounting Piston No. 17 to No. 9 using hole No. 12.
No. 14—Two hydraulic pipelines one for supply & other for return.
No. 15—Connecting blocks at 2 ends of hydraulic pipe lines No. 14.
No. 16—Double acting hydraulic cylinder situated inside No. 6.
No. 17—Piston of double acting Hydraulic cylinder No. 16.
No. 18—Hydraulic controlling unit to control movement of No. 17.
No. 19—Electronic Controlling unit to operate valves inside No. 18.
No. 20—Electronic conduit carrying current & signals to No. 19.
No. 21—Multi pin connectors at the ends of Electric conduit No. 20.
No. 22—Wing type portions provided on both sides of the body of Hydraulic cylinder No. 16 for its own mounting purpose as also to provide location and guidance for two numbers of Mechanical interlocking safety bars No. 27.
No. 23—Central supporting guide bushing integral and inbuilt part of the Base assembly housing body No. 6, for providing central support for guide bars No. 11, used for the guiding the movement of No. 9.
No. 24—Rectangular shaped Chamber provided Longitudinally on the left side of sliding assembly housing body No. 6, for accommodating the hydraulic pipelines No. 14, which are meant for supply and return of hydraulic fluid to and from the Double acting hydraulic cylinder No. 16. through No. 18.
No. 25—Rectangular shaped Chamber provided Longitudinally on the right side of sliding assembly housing body No. 6, for accommodating the Electric conduit No. 20.
No. 26—Large slot in the lower middle portion of the base housing No. 6 is for accommodating the hydraulic cylinder No. 16.
No. 27—Safety guide bars two numbers situated on either sides of the Hydraulic cylinder No. 16 meant to serve the purpose as mechanical interlocking safety bars acting between adjacently assembled sliding base assembly units No. 1.
No. 28—Centrally situated combined panel having the electronic programming & display unit at the top portion and the main hydraulic control & Monitoring unit at the bottom portion.
No. 29—Control electric wiring originating in the above mentioned combined control panel No. 28 leading to various mini control electric unit No. 19 situated inside each of No. 1.
No. 30—Hydraulic fluid supply pipe lines leading from No. 28 to various sliding base assembly No. 1, situated at various systematically distributed locations on the floor of the Aircraft cabin.
No. 31—Hydraulic fluid return pipe lines leading to No. 28 from various sliding base assembly No. 1, situated at various systematically distributed locations on the floor of the Aircraft cabin.
No. 32—Hydraulic fluid pressure line from hydraulic pump No. 35, leading to the combined control panel No. 28.
No. 33—Hydraulic return pipe line from No. 28 to the hydraulic fluid reservoir No. 34, which is symbolically shown in the drawing.
No. 34—Hydraulic oil reservoir symbolically shown & represented.
No. 35—Hydraulic oil high pressure pump which is symbolically shown & represented in the drawing.
No. 36—Master control unit in pilot cabin, so that the final authority for control and operating of the equipment mentioned in the invention will rest with the pilot operating the aircraft.
No. 37—Represents a block of seat rows of a passenger aircraft.
No. 38—Digital visual display at the roof portion of an aircraft cabin situated appropriately above & facing each Airline seating row for visually informing and instructing the seated passengers about current status and safety requirements.

I claim:

1. A programmable and periodic legroom space enhancer for airline passenger seating, comprising:
 a base assembly fixed to a floor of a passenger aircraft cabin with a bottom portion consisting of a housing body having a hydraulic sliding mechanism built into the housing body and a base cover, the hydraulic sliding mechanism connected to at least a pair of legs of a seat row of airline passenger seats that are arranged in a row, where the row of seats is configured to move in fore and aft directions with respect to another row of seats;

a pair of guide bars mounted to an inside of the housing body of the bottom portion and the pair of guide bars being rigidly fixed at two ends of the pair of guide bars and in a middle of a length of the pair of guide bars;

a seat-mover assembly incorporated inside the housing body of the bottom portion and includes a double acting hydraulic cylinder and a U-bracket connected to a piston of the double acting hydraulic cylinder and the U-bracket positioned in an inverted U-position in relation with the piston of the double acting hydraulic cylinder;

the U-bracket having two pairs of guide bushes that slide on the pair of mounted guide bars and the U-bracket having provisions for mounting the pair of legs of the row of seats and the seat-mover assembly is configured to move the seats in fore and aft directions;

a pair of channels with hydraulic pipe lines and electronic conduits are disposed along either of a pair of longitudinal sides of the housing body of the bottom portion;

sliding steel belts provided and configured to cover slots on the base cover when the slots get exposed during the movement of the seat rows;

a pair of movable safety guide-bars situated on either side of the double acting hydraulic cylinder and adjacent to the double acting hydraulic cylinder and in contact with the U-bracket, configured to extend into and away from the base assembly to act as a mechanical safety interlock between two adjacently situated sliding U-brackets;

a centrally situated combined panel having an electronic programming and display unit at a top portion of the panel and a main hydraulic control and monitoring unit at a bottom portion of the panel and a master control unit in a pilot cabin and a connecting electrical wiring;

a hydraulic reservoir, a hydraulic pump, a hydraulic control valve unit and hydraulic pipelines for operating the double acting hydraulic cylinder; and an overhead digital display unit mounted over each airline seat row electrically connected to the centrally situated combined panel to display to seated passengers a current situation of the seated passengers' particular seat row at any given time.

2. The legroom space enhancer as claimed in claim 1, wherein the double acting hydraulic cylinder is mounted in a central opening inside the housing body of the bottom portion by a pair of wing portions provided on it.

3. The legroom space enhancer as claimed in claim 2, wherein the main hydraulic control is provided with electronic valves and an electronic control unit that are situated on either sides of the mounted double acting hydraulic cylinder.

4. The legroom space enhancer as claimed in claim 1, wherein the double acting hydraulic cylinder includes a provision for its piston being operated in a controlled, programmable and periodic manner by means of hydraulic valves situated inside the housing body which in turn operate as per electrical or electronic signals sent to it from the centrally situated combined panel includes the main hydraulic control and monitoring unit having also the electronic programming and display unit which has a master control unit in the pilot cabin.

5. The legroom space enhancer as claimed in claim 1, wherein continuous feedback on the position of the piston and thereby the seat row at any given point is passed on to the centrally situated combined panel from mini electronic control unit sensors situated inside the housing body itself.

6. The legroom space enhancer as claimed in claim 1, wherein provision is made for programming the operation in such a way that when it is required that an individual seat row is moved in fore and aft directions, and also when it is required that a batch of a plurality of seat rows is moved simultaneously and in a synchronized and controlled slow manner by the hydraulic control valve unit and the electronic programming and display unit without reducing and compromising legroom provided for any of the seats.

* * * * *